United States Patent
Tsutsumi et al.

(10) Patent No.: US 11,566,551 B1
(45) Date of Patent: Jan. 31, 2023

(54) INJECTION AMOUNT CALCULATION DEVICE, INJECTION AMOUNT CONTROL METHOD, AND EXHAUST GAS PURIFICATION DEVICE

(71) Applicants: Hino Motors, Ltd., Tokyo (JP); TOYOTA JIDOSHA KABUSHIKI KAISHA, Toyota (JP)

(72) Inventors: Munechika Tsutsumi, Hino (JP); Hironori Narita, Hino (JP); Hayato Nakada, Minamitsuru-gun (JP)

(73) Assignees: Hino Motors, Ltd., Tokyo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/447,236

(22) Filed: Sep. 9, 2021

(30) Foreign Application Priority Data

Jul. 14, 2021 (JP) .............................. JP2021-116231

(51) Int. Cl.
*F01N 3/20* (2006.01)
*F01N 3/28* (2006.01)

(52) U.S. Cl.
CPC ........... *F01N 3/208* (2013.01); *F01N 3/2882* (2013.01); *F01N 2560/06* (2013.01); *F01N 2570/14* (2013.01); *F01N 2610/02* (2013.01); *F01N 2610/146* (2013.01); *F01N 2900/0601* (2013.01); *F01N 2900/1404* (2013.01); *F01N 2900/1616* (2013.01); *F01N 2900/1622* (2013.01)

(58) Field of Classification Search
CPC .... F01N 3/208; F01N 3/2882; F01N 2560/06; F01N 2570/14; F01N 2610/02; F01N 2610/146; F01N 2900/0601; F01N 2900/1404; F01N 2900/1616; F01N 2900/1622

See application file for complete search history.

(56) References Cited

U.S. PATENT DOCUMENTS

| | | | |
|---|---|---|---|
| 2011/0162347 A1* | 7/2011 | Katare | F01N 13/009 60/299 |
| 2015/0096350 A1* | 4/2015 | Miller | G01N 25/00 73/25.01 |
| 2017/0030243 A1* | 2/2017 | Li | F01N 9/007 |
| 2020/0040785 A1* | 2/2020 | Choi | F01N 3/035 |

FOREIGN PATENT DOCUMENTS

JP    2013-11255 A    1/2013

* cited by examiner

*Primary Examiner* — Brandon D Lee
(74) *Attorney, Agent, or Firm* — Oblon, McClelland, Maier & Neustadt, L.L.P.

(57) ABSTRACT

A controller 1 includes a calculation unit 10 that receives the current sensor value A1 of the vehicle and calculates an injection amount based on the current sensor value A1 and a target value of the ammonia adsorption amount of the selective reduction catalyst 105 so that the ammonia adsorption amount approaches the target value, and a prediction unit 20 that receives the current sensor value B1 and calculates a corrected target value by future prediction based on the current sensor value B1. The calculation unit 10 calculates the injection amount based on the corrected target value calculated by the prediction unit 20.

6 Claims, 6 Drawing Sheets

INJECTION AMOUNT CALCULATION DEVICE, INJECTION AMOUNT CONTROL METHOD, AND EXHAUST GAS PURIFICATION DEVICE

TECHNICAL FIELD

The present invention relates to an injection amount calculation device, an injection amount controlling method, and an exhaust purification device.

BACKGROUND

Patent document 1 describes an exhaust purification system. The exhaust purification system includes an oxidation catalyst, a DPF, and a selective reduction catalyst, which are sequentially provided in an exhaust pipe of an engine. The exhaust purification system further includes an injector to inject urea water between the DPF and the selective reduction catalyst. The selective reduction catalyst selectively reduces NOx in the exhaust gas in an atmosphere in which a reducing agent such as ammonia is present. The injector opens when a drive pulse generated by a controller is applied, and injects the urea water to the upstream side of the selective reduction catalyst. The urea water injected by the injector is thermally decomposed or hydrolyzed by the heat of the exhaust gas. As a result, ammonia is produced as a reducing agent. The produced ammonia is supplied to the selective reduction catalyst.

Patent Document 1: Japanese Unexamined Patent Publication No. 2013-11255

SUMMARY

Incidentally, when an operating state of the vehicle on which the above-described exhaust purification system and the like are mounted rapidly changes from a light load to a high load (for example, when rapid acceleration occurs), as shown in FIG. 4A to 4E, the exhaust gas flow rate F1 and the exhaust temperature T1 increase at first. Thereafter, the catalyst upstream temperature T2 and the catalyst temperature T3 increase with a delay from the increase of the exhaust temperature T1. As the catalyst temperature T3 increase, the adsorptive capacity of ammonia of the selective reduction catalyst decreases. Therefore, when an increase in the catalyst temperature T3 is detected, to avoid an increase of the ammonia slip, it is conceivable to reduce a target value Q1 of the ammonia adsorption amount of the selective reduction catalyst and reduce an injection amount I1 of the urea water to the selective reduction catalyst (Q2 in FIG. 4C indicates an actual ammonia adsorption amount (calculated value)).

On the other hand, at the time when the driving state of the vehicle is rapidly changed from the light load to the high load, since the catalyst temperature T3 is not increased, the urea water is injected at the injection amount I1 corresponding to the originally high target value Q1. Therefore, as described above, when the catalyst temperature T3 increases thereafter, ammonia is supplied to the selective reduction catalyst in excess of the adsorptive capacity, and the ammonia slip S1 increases. If the target value Q1 is decreased with a certain margin so as not to increase the ammonia slip S1, the NOx reduction performance is decreased.

Therefore, an object of the present invention is to provide an injection amount calculation device and an injection amount controlling method capable of suppressing a decrease in NOx reduction performance and suppressing ammonia slip.

The injection amount calculation device according to the present invention is mounted on a vehicle provided with a reduction catalyst to reduce nitrogen oxides contained in an exhaust gas and configured to calculate an injection amount of urea water to the reduction catalyst. The injection amount calculation device includes a first injection amount calculation unit configured to receive an input of a current sensor value of the vehicle and calculate the injection amount based on the current sensor value and a target value of an ammonia adsorption amount of the reduction catalyst so that the ammonia adsorption amount approaches the target value; and a future prediction unit configured to receive an input of the current sensor value and calculate a corrected target value that is a corrected value of the target value by a future prediction based on the current sensor value. The first injection amount calculation unit calculates the injection amount based on the corrected target value calculated by the future prediction unit.

An injection amount controlling method according to the present invention controls an injection amount of urea water to a reduction catalyst for reducing nitrogen oxides contained in exhaust gas of a vehicle. The injection amount controlling method comprises: a target value correction step of correcting a target value of an ammonia adsorption amount of the reduction catalyst to be low when occurrence of an ammonia slip at the reduction catalyst is predicted by future prediction based on a current sensor value of the vehicle; and an injection amount control step of controlling the injection amount so that the ammonia adsorption amount approaches the target value corrected in the target value correction step.

In the devices and methods, the target value of the ammonia adsorption amount of the reduction catalyst is corrected by a future prediction based on the current sensor value of the vehicle. Therefore, for example, in a situation where an increase of the ammonia slip is expected in the future with the injection amount of the urea water corresponding to the current target value of the ammonia adsorption amount, the target value of the ammonia adsorption amount can be corrected to be small so that the ammonia slip does not occur. On the other hand, in a situation where an increase in ammonia slip is not predicted in the future, it is possible to avoid correcting the target value of the ammonia adsorption amount to be unnecessarily small. Therefore, according to the device and method, it is possible to suppress a decrease in NOx reduction performance and to suppress ammonia slip.

On the other hand, in this apparatus, a portion (first injection amount calculation unit) to calculate the injection amount of urea water so that the ammonia adsorption amount approaches the target value and a portion (future prediction unit) to calculate the corrected target value which is a corrected value of the target value by future prediction are separately configured, and the sensor value of the vehicle is input to each portion. Therefore, for example, it is possible to prepare a dedicated core of a vehicle-mounted computer for the future prediction unit having a relatively high load and distribute the first injection amount calculation unit having a relatively low load to another core.

In the injection amount calculation device according to the present invention, the future prediction unit may perform the future prediction using a temperature of the exhaust gas before being introduced into a catalyst unit of the vehicle that includes the reduction catalyst, among the sensor values. As described above, for example, as compared with the catalyst temperature or the like, the future prediction is performed by using the exhaust gas temperature having a quick response to the change in the operation state, and thus it is possible to correct the target value of the ammonia adsorption amount more appropriately.

In the injection amount calculation device according to the present invention, the future prediction unit may include: a second injection amount calculation unit configured to calculate the injection amount based on the current sensor value and a current target value, which is the current target value, so that the ammonia adsorption amount approaches the current target value; a first cost calculation unit configured to calculate a first cost by future prediction based on the injection amount calculated by the second injection amount calculation unit and a first tentative target value set to be larger than the current target value, wherein the first cost is a cost of the first tentative target value; and a second cost calculation unit configured to calculate a second cost by future prediction based on the injection amount calculated by the second injection amount calculation unit and a second tentative target value set to be smaller than the current target value, wherein the second cost is a cost of the second tentative target value; and a corrected target value setting unit configured to set one of the first tentative target value and the second tentative target value that gives a smaller cost as the corrected target value by comparing the first cost with the second cost. As described above, the load of the future prediction unit is reduced by introducing the cost for the future prediction for correcting the target value of the ammonia adsorption amount.

In the injection amount calculation device according to the present invention, the first cost calculation unit may calculate the first cost such that the first cost increases as a slip amount of ammonia from the reduction catalyst increases, and the second cost calculation unit may calculate the second cost such that the second cost increases as the slip amount of ammonia from the reduction catalyst increases. In this case, ammonia slip can be reliably reduced. As a result, it is possible to reduce the size of the ammonia slip catalyst, thereby reducing the cost.

According to the present invention, it is possible to provide an injection amount calculation device and an injection amount controlling method capable of suppressing a decrease in NOx reduction performance and suppressing ammonia slip.

The exhaust purification device includes a first selective reduction catalyst provided in an exhaust passage through which exhaust gas generated by an internal combustion engine flows; an oxidation catalyst provided downstream of the first selective reduction catalyst in the exhaust passage; a second selective reduction catalyst provided downstream of the oxidation catalyst in the exhaust passage; a first injector to inject urea water into the exhaust passage upstream of the first selective reduction catalyst; a second injector to inject urea water into the exhaust passage downstream of the first selective reduction catalyst and upstream of the second selective reduction catalyst; an injection amount calculation device to determine an injection amount of urea water injected from the first injector and the second selective reduction catalyst; and a temperature sensor to acquire a temperature of the exhaust gas or a temperature of the first selective reduction catalyst as a sensor value; wherein the injection amount calculation device comprises: a calculation unit to determine the injection amount of the urea water from the first injector based on the sensor value and a target value of an ammonia adsorption amount of the first selective reduction catalyst so that the ammonia adsorption amount of the first selective reduction catalyst approaches the target value; and a prediction unit to predict occurrence of an ammonia slip at the first selective reduction catalyst at a future time point based on the sensor value, and reduce the target value when the occurrence of the ammonia slip is predicted.

As described above, the exhaust purification device according to one aspect, it is possible to suppress a decrease in NOx reduction performance and to suppress the ammonia slip. Furthermore, in the exhaust purification device, since the amount of ammonia introduced into the oxidation catalyst can be reduced by suppressing the ammonia slip, the production of nitrous oxide ($N_2O$) can be suppressed.

The sensor may acquire a temperature of the exhaust gas at an upstream side of the first selective reduction catalyst as the sensor value.

DETAILED DESCRIPTION

First Embodiment

Figure 1:
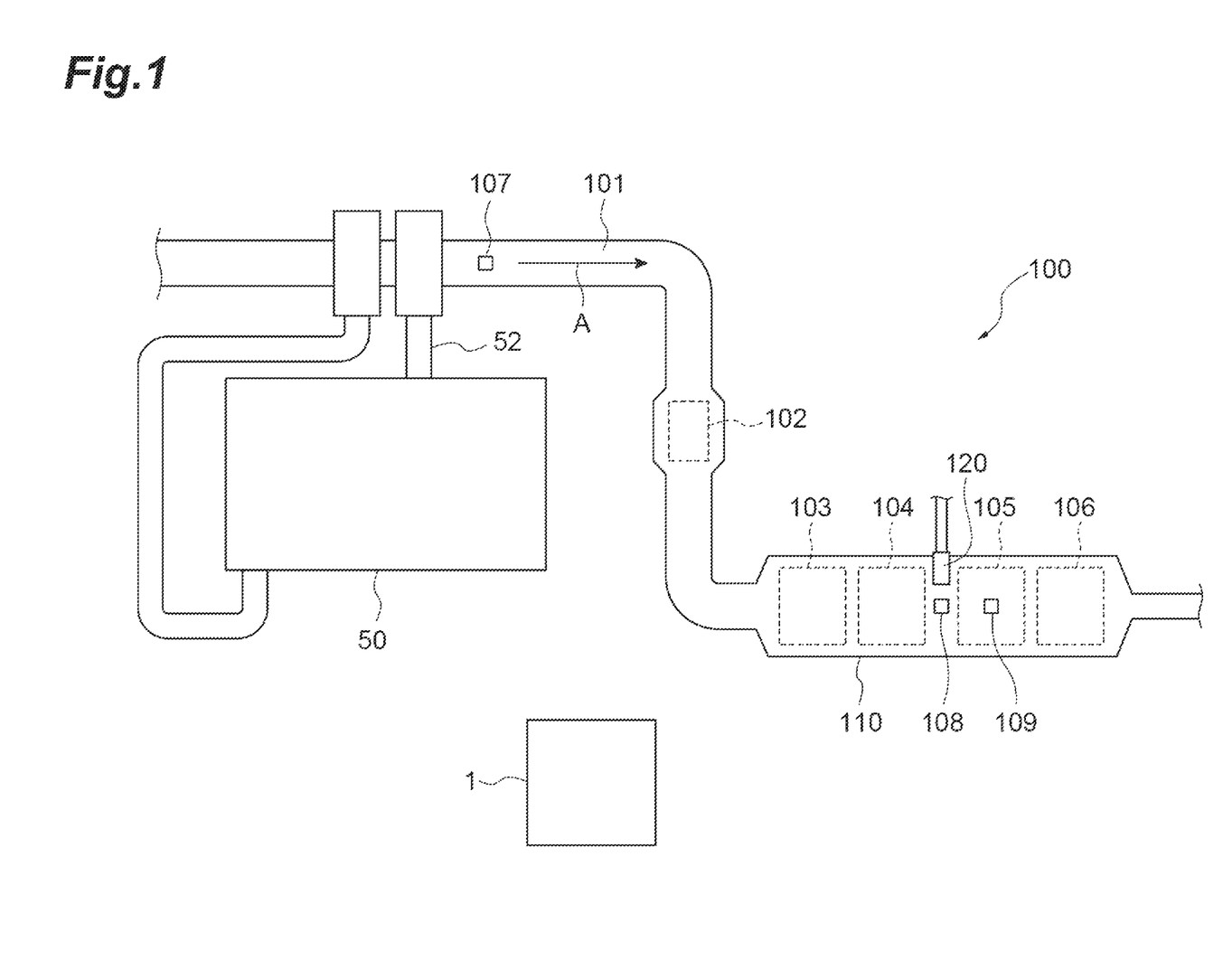
FIG. 1 is a diagram schematically illustrating an example of an exhaust purification device according to a first embodiment.

Hereinafter, an exhaust purification device according to a first embodiment will be described in detail with reference to the drawings. FIG. 1 is a schematic diagram illustrating an example of an exhaust purification device. The exhaust purification device 100 shown in FIG. 1 is mounted on a vehicle including a diesel engine (internal combustion engine) 50, for example. The exhaust purification device 100 includes a controller (injection amount calculation device) 1, a catalyst unit 110, and an injection portion 120. The catalyst unit 110 is provided in an exhaust pipe 101 connected to an exhaust port of the diesel engine 50 via an exhaust manifold 52. The catalyst unit 110 includes an oxidation catalyst 103, a diesel particulate filter (DPF) 104, a selective reduction catalyst 105, and an ammonia reduction catalyst 106 arranged in this order from the upstream side of the exhaust pipe 101.

The oxidation catalyst 103 performs oxidation treatment of the exhaust gas A. The DPF 104 collects particulate matter in the exhaust gas A. The selective reduction catalyst 105 is supplied with a reducing agent and reduces nitrogen oxides (NOx) in the exhaust gas A. The reducing agent is, for example, ammonia. The injection portion 120 injects urea water to the selective reduction catalyst 105 (adds urea water to the exhaust gas A). As a result, the urea water is thermally decomposed into ammonia and carbon dioxide gas, and ammonia is supplied to the selective reduction catalyst 105.

The selective reduction catalyst 105 reduces nitrogen oxides in the exhaust gas A using ammonia. The ammonia reduction catalyst 106 oxidizes excess ammonia. The exhaust purification device 100 may further include an after-turbo catalyst (ATC) 102 provided in the exhaust pipe 101 between the connector between the diesel engine 50 and the exhaust pipe 101 and the catalyst unit 110.

The exhaust purification device 100 includes temperature sensors 107, 108 and 109. The temperature sensor 107 is provided immediately below the connector between the diesel engine 50 and the exhaust pipe 101 and upstream of the catalyst unit 110 (here, upstream of the ATC 102). The temperature sensor 107 detects the temperature of the exhaust gas A on the upstream side of the catalyst unit 110 (hereinafter it may be referred to as "exhaust gas temperature") and inputs the detected temperature to the controller 1.

The temperature sensor 108 is provided upstream of the selective reduction catalyst 105 in the catalyst unit 110. The temperature sensor 108 detects the temperature of the exhaust gas A on the upstream side of the selective reduction catalyst 105 (hereinafter, it may be referred to as "catalyst upstream temperature") and inputs the detected temperature to the controller 1. The temperature sensor 109 is provided in the selective reduction catalyst 105. The temperature sensor 109 detects the temperature of the selective reduction catalyst 105 (hereinafter, it may be referred to as "catalyst temperature") and inputs the catalyst temperature to the controller 1.

As described above, the controller 1 acquires the exhaust gas temperature, the catalyst upstream temperature, and the catalyst temperature using the temperature sensors 107 to 109. Further, the controller 1 may acquire the flow rate of the exhaust gas A, the injection amount of the urea water from the injection portion 120, the outside air temperature, the concentration of oxygen in the exhaust gas A, the concentration of nitrogen oxides in the exhaust gas A on the upstream side of the selective reduction catalyst 105, and the like by using other sensors not shown in the drawings.

The controller 1 is physically configured as a computer system including a central processing unit (CPU), a random access memory (RAM) as a main storage device, a read only memory (ROM), a communication module as a data transmission/reception device, and the like. Each functional unit shown in FIG. 2 is realized by reading a predetermined program on the above-described hardware, operating the communication module under the control of the CPU, and reading and writing data in the RAM or the like.

Figure 2:
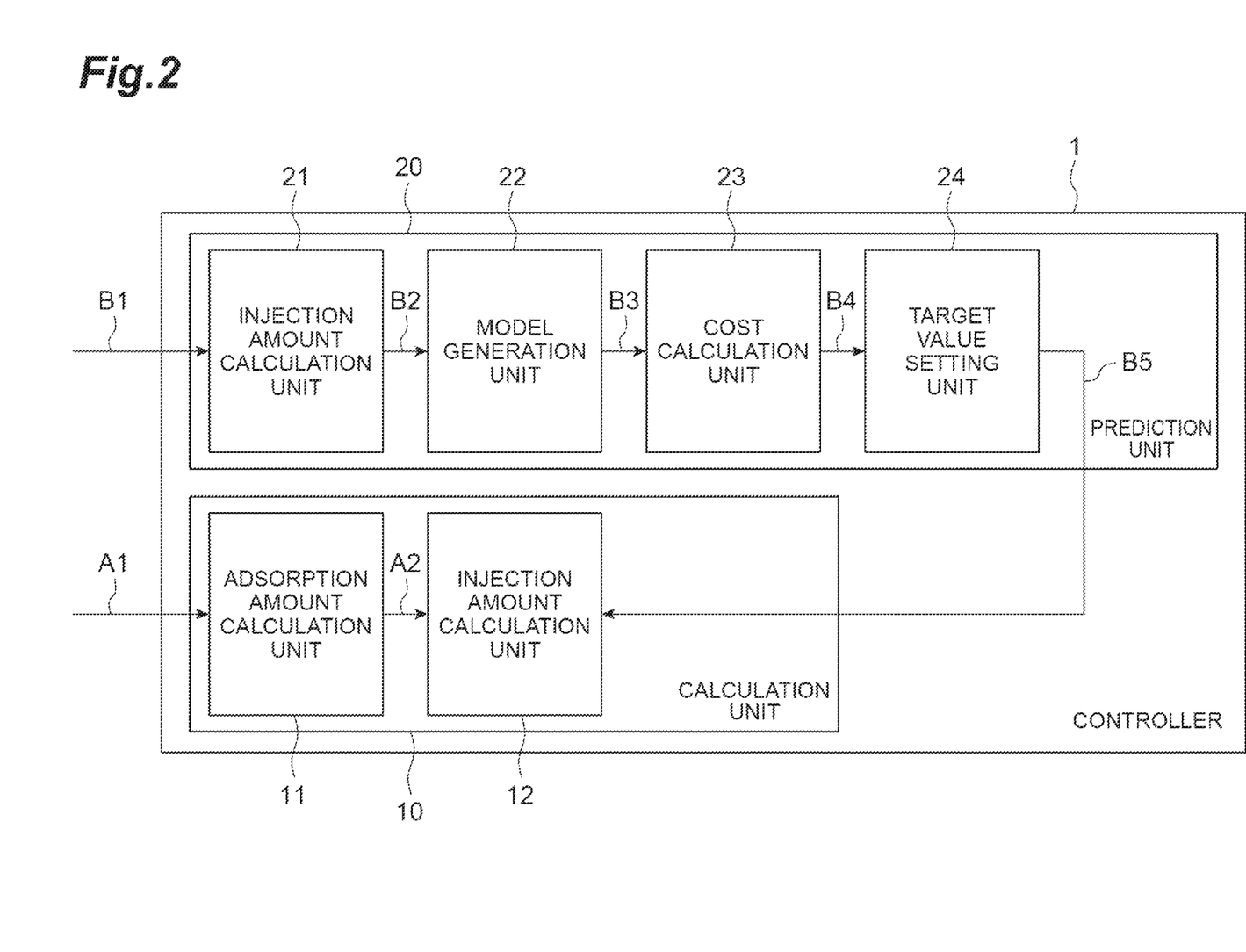
FIG. 2 is a diagram illustrating a functional configuration of a part of a controller illustrated in FIG. 1.

FIG. 2 is a diagram showing a functional configuration of a part of the controller shown in FIG. 1. The controller 1 shown in FIG. 2 functions as an injection amount calculation device to calculate an injection amount of the urea water to the selective reduction catalyst 105. For this purpose, the controller 1 includes a calculation unit (first injection amount calculation unit) 10 and a prediction unit (future prediction unit) 20. The calculation unit 10 includes an adsorption amount calculation unit 11 and an injection amount calculation unit 12.

The adsorption amount calculation unit 11 receives a current sensor value A1 of the vehicle and calculates the current ammonia adsorption amount of the selective reduction catalyst 105 based on the sensor value A1. The sensor value A1 is various values acquired by the controller 1 as described above, and is, for example, the exhaust gas temperature. The adsorption amount calculation unit 11 outputs the calculated ammonia adsorption amount A2 to the injection amount calculation unit 12.

The injection amount calculation unit 12 receives the ammonia adsorption amount A2 from the adsorption amount calculation unit 11. The injection amount calculation unit 12 calculates the injection amount of the urea water from the injection portion 120 based on the ammonia adsorption amount A2 (i.e. the sensor value A1) and the target value of the ammonia adsorption amount of the selective reduction catalyst so that the ammonia adsorption amount A2 approaches the target value. The target value of the ammonia adsorption amount is set in advance. The controller 1 outputs a control signal to the injection portion 120 so that the urea water is injected in the injection amount calculated by the injection amount calculation unit 12.

The prediction unit 20 corrects the target value of the ammonia adsorption amount by future prediction based on prediction control such as reference governor control. To this end, the prediction unit 20 includes an injection amount calculation unit (second injection amount calculation unit) 21, a model generation unit 22, a cost calculation unit (first cost calculation unit, second cost calculation unit) 23, and a target value setting unit (corrected target value setting unit) 24. The injection amount calculation unit 21 receives the current sensor value B1 of the vehicle. The sensor value B1 is various values acquired by the controller 1, and is, for example, the exhaust gas temperature, like the sensor value A1.

The injection amount calculation unit 21 calculates the injection amount of the urea water based on the current sensor value B1 and the current target value which is the current target value of the ammonia adsorption amount so that the ammonia adsorption amount approaches the current target value. The injection amount calculation unit 21 outputs the calculated injection amount B2 of the urea water to the model generation unit 22. The model generation unit 22 receives the injection amount B2 and generates a future prediction model based on the injection amount B2 and the current target value.

Here, the model generation unit 22 generates a first model for future prediction based on the injection amount B2 and a first tentative target value set larger than the current target value. Further, the model generation unit 22 generates a second model for future prediction based on the injection amount B2 and a second tentative target value set smaller than the current target value. The model generation unit 22 outputs information B3 indicating the generated first model and second model to the cost calculation unit 23.

The cost calculation unit 23 receives the input of information B3, calculates a first cost which is a cost of the first tentative target value by the future prediction based on the first model, and calculates a second cost which is a cost of the second tentative target value by the future prediction based on the second model. More specifically, the cost calculation unit 23 calculates the first cost so as to become a larger value as the slip amount of ammonia from the selective reduction catalyst 105 becomes larger, and calculates the second cost so as to become a larger value as the slip amount of ammonia of the selective reduction catalyst 105 becomes larger.

As described above, the cost calculation unit 23 functions as a first cost calculation unit for calculating the first cost and a second cost calculation unit for calculating the second cost. The cost calculation unit 23 outputs information B4 indicating the calculated first cost and second cost to the target value setting unit 24.

The target value setting unit 24 receives the input of information B4, compares the first cost with the second cost, and sets one of the first tentative target value and the second tentative target value that gives a smaller cost as the corrected target value. As an example, the target value setting unit 24 sets the first tentative target value as the corrected target value when the first cost calculated by the future prediction using the first model based on the first tentative target value is smaller than the second cost calculated by the future prediction using the second model based on the second tentative target value.

The prediction unit 20 can update the corrected target value by repeatedly performing the series of operations described above. That is, in the prediction unit 20, models (first and second models) are generated in accordance with tentative target values (first and second tentative target values) based on the corrected target value set by the target value setting unit 24, and the costs (first and second costs) of the models are calculated and compared, whereby the corrected target value can be further corrected. Thus, in the prediction unit 20, the future prediction and the correction of the target value can be repeated a predetermined number of times (or until the target value giving the cost equal to or lower than the predetermined threshold value is obtained).

The target value setting unit 24 outputs the set corrected target value B5 to the injection amount calculation unit 12 of the calculation unit 10. Therefore, the injection amount calculation unit 12 can calculate the injection amount of the urea water based on the corrected target value calculated by the prediction unit 20.

As described above, the controller 1 performs the injection amount controlling method for controlling the injection amount of the urea water. In particular, as described above, the first cost and the second cost are determined in consideration of the ammonia slip (when the ammonia slip occurs, the first cost and the second cost are larger than those when the ammonia slip does not occur). In other words, the controller 1 executes the target value correction step of correcting the target value of the ammonia adsorption amount of the selective reduction catalyst 105 to a low value when occurrence of ammonia slip at the selective reduction catalyst 105 is predicted by future prediction based on the current sensor value B1 of the vehicle, and the injection amount control step of controlling the injection amount of the urea water so that the ammonia adsorption amount approaches the target value corrected in the target value correction step.

Subsequently, the operation and effect of the exhaust purification device 100 will be described. As shown in FIGS. 3A to 3E, when the operating state of the vehicle suddenly changes from a light load to a high load (for example, when sudden acceleration occurs), first, the exhaust gas flow rate F1 and the exhaust temperature T1 increase. Thereafter, the catalyst upstream temperature T2 and the catalyst temperature T3 increase with a delay from the increase of the exhaust temperature T1.

As the catalyst temperature T3 increases, the adsorptive capacity of ammonia of the selective reduction catalyst 105 decreases. Therefore, when the increase of the catalyst temperature T3 is detected, in order to avoid an increase of the ammonia slip, it is conceivable to reduce the target value Q1 of the ammonia adsorption amount of the selective reduction catalyst and reduce the injection amount I1 of the urea water to the selective reduction catalyst (Q2 in FIG. 3C indicates an actual ammonia adsorption amount (calculated value)).

On the other hand, at the time when the driving state of the vehicle is rapidly changed from the light load to the high load, since the catalyst temperature T3 is not increased, the urea water is injected at the injection amount I1 corresponding to the originally high target value Q1. Therefore, as described above, when the catalyst temperature T3 increases thereafter, the ammonia is supplied to the selective reduction catalyst in excess of the adsorptive capacity and the ammonia slip S1 increases. If the target value Q1 is decreased with a certain margin so as not to increase the ammonia slip S1, the NOx reduction performance is decreased.

Figure 3A:
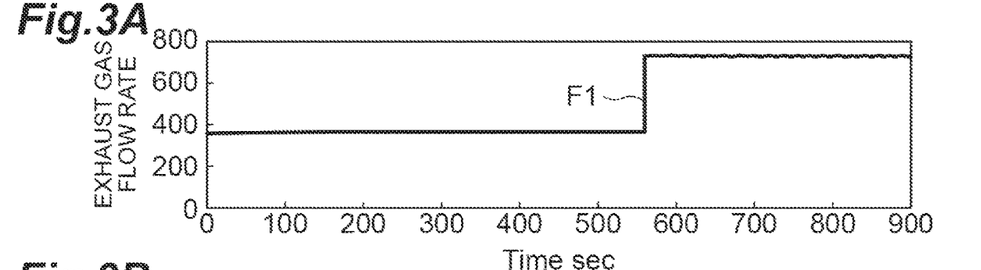
FIG. 3 is a graph showing a temporal change of each value of the exhaust purification device.
Figure 3B:
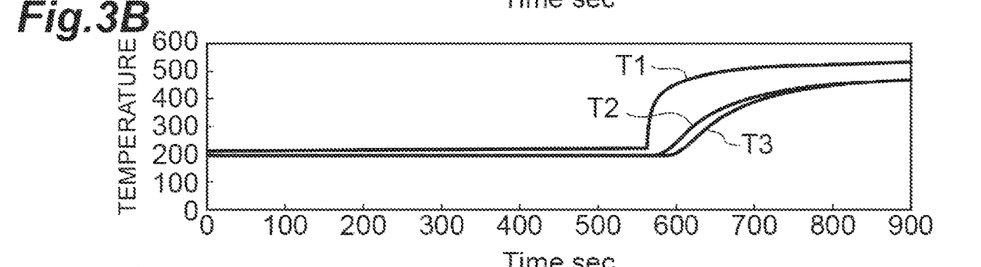
Figure 3C:
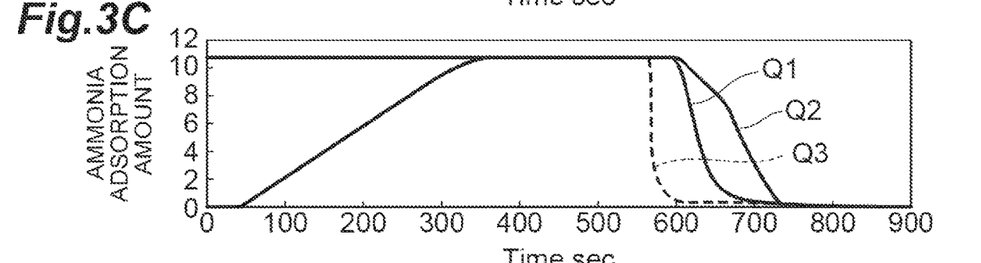
Figure 3D:
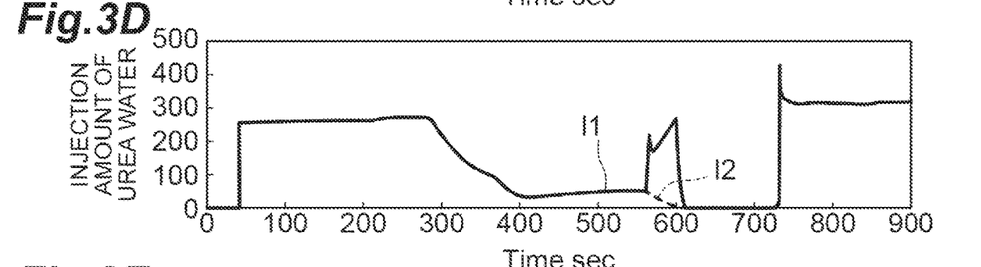
Figure 3E:
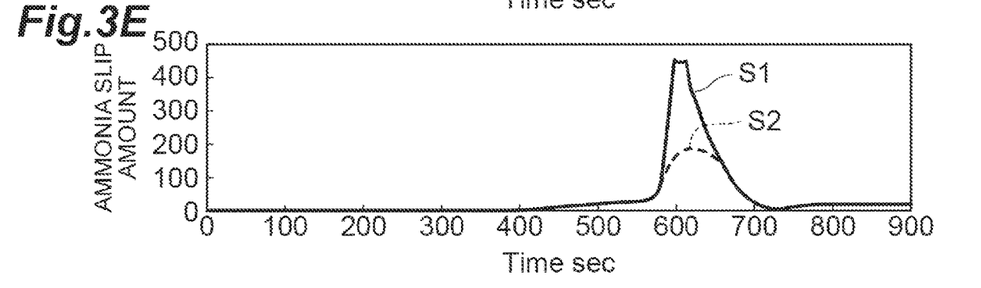
Figure 4A:
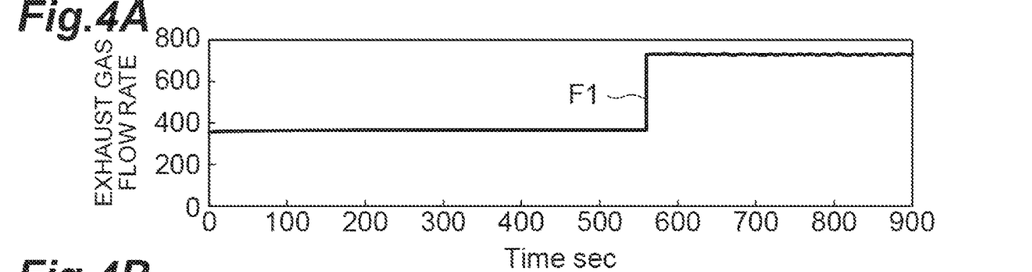
FIG. 4 is a graph showing a temporal change of each value of the exhaust purification device.
Figure 4B:
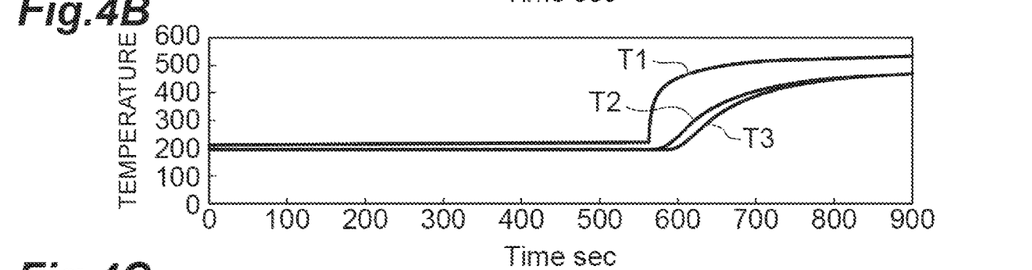
Figure 4C:
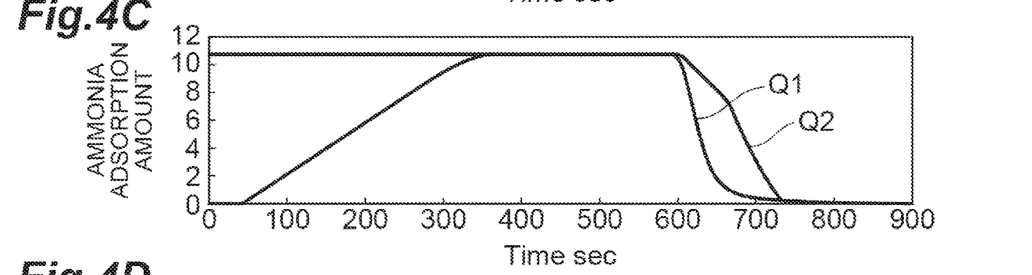
Figure 4D:
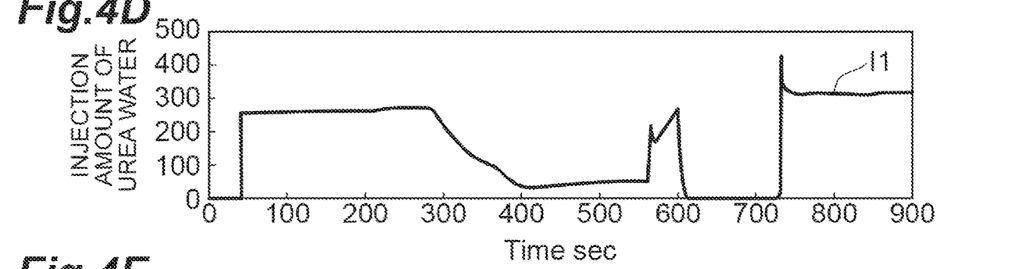
Figure 4E:
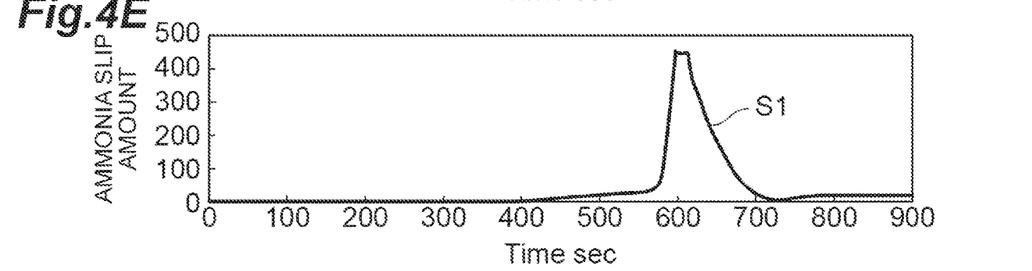

On the other hand, in the controller 1 and the injection amount controlling method of the controller 1, the target value Q1 of the ammonia adsorption amount of the selective reduction catalyst 105 is corrected by the future prediction based on the current sensor value B1 of the vehicle (Q3 in FIG. 3C indicates the corrected target value). Therefore, for example, in a situation where an increase of ammonia slip is expected in the future with the injection amount of the urea water corresponding to the current target value Q1 of the ammonia adsorption amount, the target value Q1 of the ammonia adsorption amount is corrected to be small so that the ammonia slip S1 does not occur. As a result, as shown in FIG. 3E, an increase of ammonia slip S2 can be avoided. On the other hand, in a situation where an increase in ammonia slip is not predicted in the future, it is possible to avoid correcting the target value Q1 of the ammonia adsorption amount to be unnecessarily small. Therefore, according to the controller 1 and the injection amount controlling method of the controller 1, it is possible to suppress the deterioration of the NOx reduction performance and to suppress the ammonia slip.

On the other hand, in the controller 1, a portion (calculation unit 10) to calculate the injection amount of the urea water so that the ammonia adsorption amount approaches the target value and a portion (prediction unit 20) to calculate the corrected target value which is a corrected value of the target value by future prediction are separately configured, and the sensor values A1 and B1 of the vehicle are input to the respective portions. Therefore, for example, it is possible to prepare a dedicated core of the computer mounted on the vehicle for the prediction unit 20 having a relatively high load and to distribute the calculation unit 10 having a relatively low load to another core.

Further, in the controller 1, the prediction unit 20 can perform future prediction using the exhaust gas temperature before being introduced into the catalyst unit 110 including the selective reduction catalyst 105 among the sensor values B1. As described above, for example, as compared with the catalyst temperature or the like, the future prediction is performed by using the exhaust gas temperature having a quick response to the change in the operation state, and thus it is possible to correct the target value of the ammonia adsorption amount more appropriately.

Further, in the controller 1, the prediction unit 20 includes the injection amount calculation unit 21 to calculate the injection amount based on the current sensor value B1 and a current target value, which is the current target value, so that the ammonia adsorption amount approaches the current target value, the first cost calculation unit (the cost calculation unit 23) to calculate the first cost, which is a cost of the first tentative target value, by future prediction based on the injection amount calculated by the injection amount calculation unit 21 and the first tentative target value set to be larger than the current target value, the second cost calculation unit (the cost calculation unit 23) to calculate the second cost, which is a cost of the second tentative target value, by future prediction based on the injection amount calculated by the injection amount calculation unit 21 and the second tentative target value set to be smaller than the current target value, and the target value setting unit 34 to set one of the first tentative target value and the second tentative target value that gives a smaller cost as the corrected target value by comparing the first cost with the second cost. As described above, the load of the prediction unit 20 is reduced by introducing the cost for the future prediction for correcting the target value of the ammonia adsorption amount.

Further, in the controller 1, the cost calculation unit 23 calculates the first cost so as to become a larger value as the ammonia slip from the selective reduction catalyst 105 becomes larger, and calculates the second cost so as to become a larger value as the ammonia slip becomes larger. Therefore, the ammonia slip can be reliably reduced. As a result, cost reduction can be realized by downsizing the ammonia slip catalyst (for example, ammonia reduction catalyst 106).

Second Embodiment

Next, the exhaust purification device according to a second embodiment will be described. Hereinafter, differences from the exhaust purification device 100 according to the first embodiment will be mainly described, and redundant description will be omitted.

Figure 5:
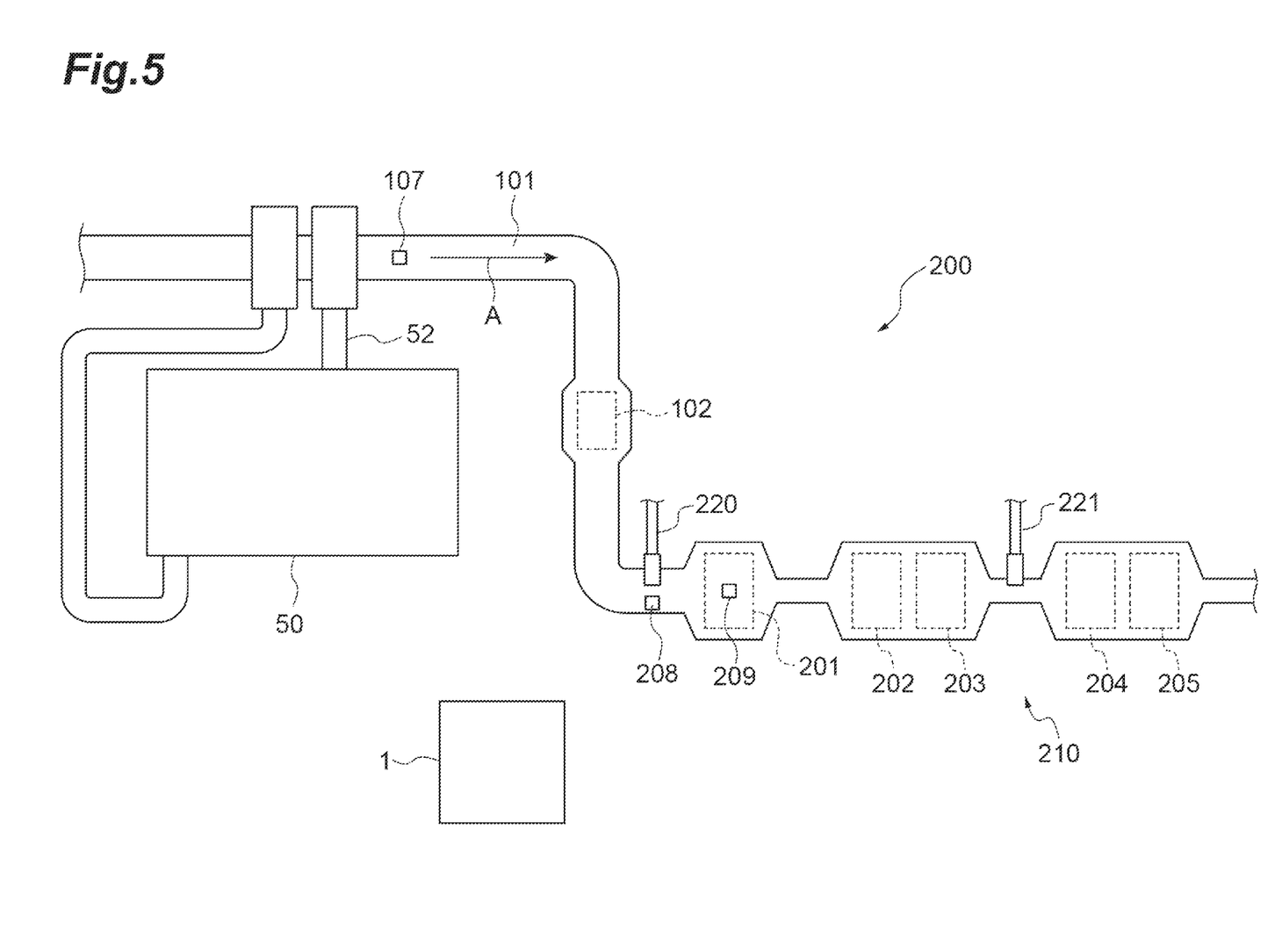
FIG. 5 is a diagram schematically illustrating an exhaust purification device according to the second embodiment.

FIG. 5 is a diagram schematically showing an exhaust purification device 200 according to the second embodiment. As shown in FIG. 5, the exhaust purification device 200 includes a catalyst unit 210 instead of the catalyst unit 110. The catalyst unit 210 is provided in an exhaust pipe 101 providing an exhaust passage, and includes a first selective reduction catalyst 201, an oxidation catalyst 202, a DPF 203, a second selective reduction catalyst 204, and an ammonia reduction catalyst 205.

The first selective reduction catalyst 201 is provided downstream of the ATC 102 in the exhaust pipe 101. The first selective reduction catalyst 201 reduces NOx contained in the exhaust gas to nitrogen ($N_2$) and water ($H_2O$) using, for example, ammonia as a reducing agent. The oxidation catalyst 202 is provided downstream of the first selective reduction catalyst 201 in the exhaust pipe 101. The oxidation catalyst 202 oxidizes and purifies hydrocarbons (HC) and the like contained in the exhaust gas.

The DPF 203 is provided downstream of the oxidation catalyst 202 in the exhaust pipe 101. The DPF 203 collects particulate matter contained in the exhaust gas. The second selective reduction catalyst 204 is provided downstream of the DPF 203 in the exhaust pipe 101. The second selective reduction catalyst 204 reduces NOx contained in the exhaust gas to nitrogen and water using, for example, ammonia as a reducing agent. The ammonia reduction catalyst 205 oxidizes excess ammonia.

The exhaust purification device 200 further includes a first injector 220 and a second injector 221. The first injector 220 injects the urea water as a reducing agent into the exhaust pipe 101 on the upstream side of the first selective reduction catalyst 201. The urea water injected into the exhaust pipe 101 is hydrolyzed into ammonia by the heat of the exhaust gas and supplied to the first selective reduction catalyst 201. The ammonia supplied to the first selective reduction catalyst 201 reduces NOx on the first selective reduction catalyst 201.

The second injector 221 injects the urea water as a reducing agent into the exhaust pipe 101 downstream of the first selective reduction catalyst 201 and upstream of the second selective reduction catalyst 204. The urea water injected into the exhaust pipe 101 is hydrolyzed into ammonia by the heat of the exhaust gas and supplied to the second selective reduction catalyst 204. The ammonia supplied to the second selective reduction catalyst 204 reduces NOx on the second selective reduction catalyst 204.

The catalyst unit 210 may include a temperature sensors 208 and 209. The temperature sensor 208 is provided upstream of the first selective reduction catalyst 201 to detect the temperature of the exhaust gas upstream of the first selective reduction catalyst 201. The temperature sensor 209 detects the temperature of the first selective reduction catalyst 201. The temperature sensors 208 and 209 output information indicating the detected temperature of the exhaust gas or the first selective reduction catalyst 201 to the controller 1.

Similarly to the exhaust purification device 100 according to the first embodiment, the controller 1 predicts the ammonia slip amount of the first selective reduction catalyst 201 by a prediction model using reference governor control or the like, and corrects the target value of the ammonia adsorption amount of the first selective reduction catalyst 201 so that the ammonia slip amount decreases.

Figure 6:
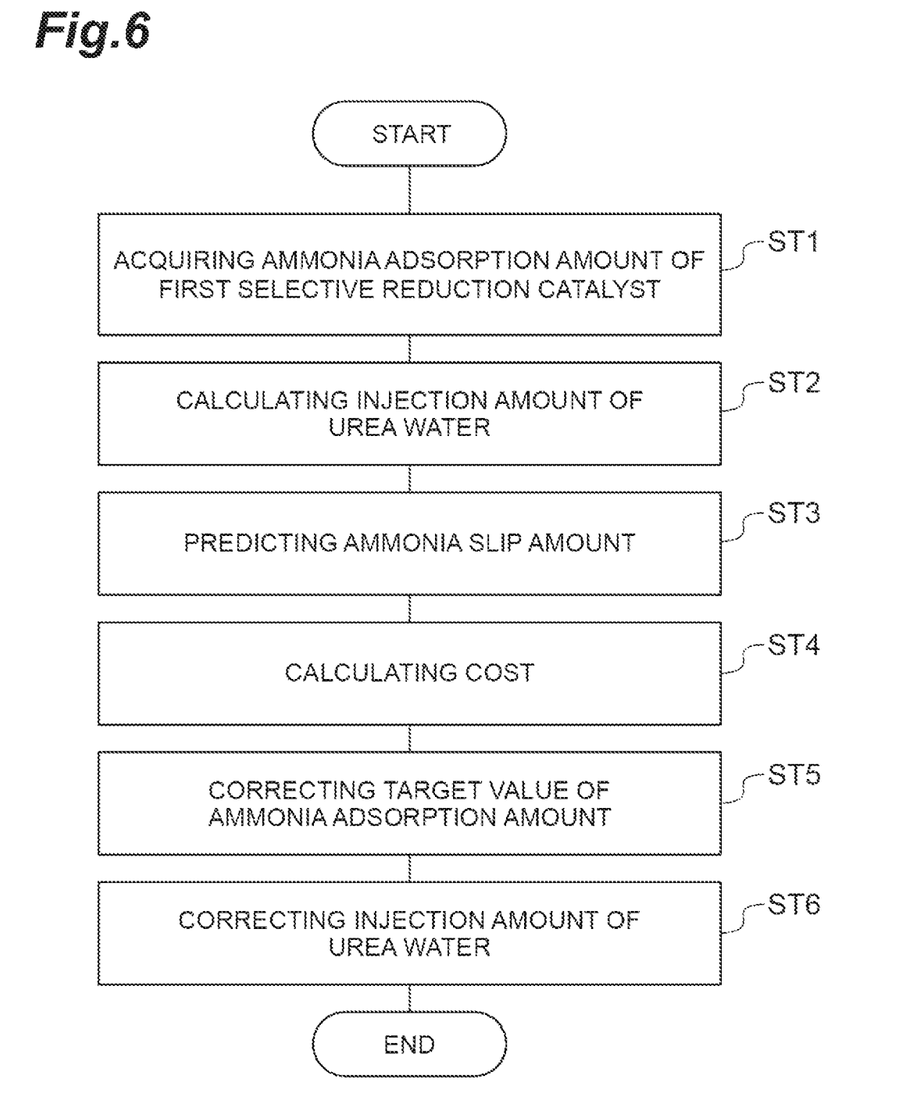
FIG. 6 is a flowchart illustrating an injection amount controlling method according to an embodiment.

An example of processing performed by the controller 1 will be described in detail with reference to FIGS. 2 and 6. FIG. 6 is a flowchart illustrating an example of an injection amount controlling method performed by the exhaust purification device 200.

As shown in FIG. 6, first, the adsorption amount calculation unit 11 calculates the ammonia adsorption amount A2 of the first selective reduction catalyst 201 at the present time (step ST1). The ammonia adsorption amount A2 of the first selective reduction catalyst 201 is calculated based on, for example, the sensor value A1, the NOx concentration in the exhaust gas, and the first injector 220. Next, the injection amount calculation unit 12 determines the injection amount of the urea water to be injected by the first injector 220 based on the ammonia adsorption amount A2 at the present time and the target value of the ammonia adsorption amount (step ST2). At this time, the injection amount calculation unit 12 determines the injection amount of the urea water so that the ammonia adsorption amount A2 of the first selective reduction catalyst approaches the target value of the ammonia adsorption amount.

Next, the model generation unit 22 predicts the ammonia slip amount of the first selective reduction catalyst 201 at a future time point based on the determined injection amount B2 of the urea water and the target value of the ammonia adsorption amount (step ST3). More specifically, the model generation unit 22 sets the first tentative target value larger than the target value of the ammonia adsorption amount by a predetermined value and the second tentative target value smaller than the target value of the ammonia adsorption amount by a predetermined value. Then, the model generation unit 22 predicts the ammonia slip amount of the first selective reduction catalyst 201 under the first prediction model assuming that the ammonia adsorption amount of the first selective reduction catalyst 201 is controlled to be the first tentative target value, and predicts the ammonia slip amount of the first selective reduction catalyst 201 under the second prediction model assuming that the ammonia adsorption amount of the first selective reduction catalyst 201 is controlled to be the second tentative target value. In addition to the ammonia slip amount, the model generation unit 22 may predict the NOx reduction amount of the first selective reduction catalyst 201 based on the first prediction model, and may predict the NOx reduction amount of the first selective reduction catalyst 201 based on the second prediction model.

Next, the cost calculation unit 23 calculates the first cost and the second cost based on the ammonia slip amount of the first selective reduction catalyst 201 predicted by the first prediction model and the second prediction model (step ST4). For example, the cost calculation unit 23 increases the first cost and the second cost as the predicted ammonia slip amount increases.

Next, the target value setting unit 24 corrects the target value of the ammonia adsorption amount of the first selective reduction catalyst 201 based on the first cost and the second cost (step ST5). For example, when the first cost is smaller than the second cost, the target value setting unit 24 changes the target value of the ammonia adsorption amount to the first tentative target value. On the other hand, when the first cost is larger than the second cost, the target value setting unit 24 changes the target value of the ammonia adsorption amount to the second tentative target value. That is, the target value setting unit 24 lowers the target value of the ammonia adsorption amount so as to reduce the ammonia slip amount when the occurrence of the ammonia slip is predicted at the first selective reduction catalyst 201. The target value setting unit 24 outputs the target value of the changed ammonia adsorption amount to the injection amount calculation unit 12 as the corrected target value.

Next, the injection amount calculation unit 12 determines the injection amount of the urea water to be injected by the first injector 220 based on the corrected target value (step ST6). Accordingly, the injection amount of the urea water of the first injector 220 is corrected so that the ammonia adsorption amount of the first selective reduction catalyst 201 becomes the corrected target value.

When the ammonia slip occurs at the first selective reduction catalyst 201, ammonia passing through the first selective reduction catalyst 201 is oxidized by the oxidation catalyst 202, and nitrous oxide ($N_2O$), which is a greenhouse gas, is generated. In contrast, as described above, in the exhaust purification device 200 according to the second embodiment, when it is predicted that the ammonia slip will occur in the first selective reduction catalyst 201, the target value of the ammonia adsorption amount is decreased so that the ammonia slip amount is decreased, and thus the amount of ammonia introduced into the oxidation catalyst 202 is decreased. As a result, generation of $N_2O$ can be suppressed.

The above embodiment has described one mode of the present invention. Therefore, the present invention is not limited to the above-described embodiment, and can be modified.

For example, the cost calculation unit 23 may calculate the first cost and the second cost such that the first cost and the second cost decrease as the NOx reduction rate of the first selective reduction catalyst 201 increases, and the first cost and the second cost increase as the NOx reduction rate of the first selective reduction catalyst 201 decreases. By calculating the first cost and the second cost in this manner, it is possible to suppress ammonia slip while effectively reducing NOx.

DESCRIPTION OF REFERENCE SIGNS

1: controller (injection amount calculation device), 10: calculation unit (first injection amount calculation unit), 20: prediction unit (future prediction unit), 21: injection amount calculation unit (second injection amount calculation unit), 23: cost calculation unit (first cost calculation unit, second cost calculation unit), 24: target value setting unit corrected target value setting unit), 50: diesel engine, 100, 200: exhaust purification device, 103, 202: oxidation catalyst, 105: selective reduction catalyst, 107, 108, 109, 208, 209: temperature sensor, 201: first selective reduction catalyst, 204: second selective reduction catalyst, 220: first injector, 221: second injector.

What is claimed is:

1. An injection amount calculation device mounted on a vehicle provided with a reduction catalyst to reduce nitrogen oxides contained in an exhaust gas and configured to calculate an injection amount of urea water to the reduction catalyst, the injection amount calculation device comprising:
   a first injection amount calculation unit configured to receive an input of a current sensor value of the vehicle and calculate the injection amount based on the current sensor value and a target value of an ammonia adsorption amount of the reduction catalyst so that the ammonia adsorption amount approaches the target value; and
   a future prediction unit configured to receive an input of the current sensor value and calculate a corrected target value that is a corrected value of the target value by a future prediction based on the current sensor value, wherein
   the first injection amount calculation unit calculates the injection amount based on the corrected target value calculated by the future prediction unit, and
   the future prediction unit includes:
      a second injection amount calculation unit configured to calculate the injection amount based on the current sensor value and a current target value so that the ammonia adsorption amount approaches the current target value;
      a first cost calculation unit configured to calculate a first cost by future prediction based on the injection amount calculated by the second injection amount calculation unit and a first tentative target value set to be larger than the current target value, wherein the first cost is a cost of the first tentative target value;
      a second cost calculation unit configured to calculate a second cost by future prediction based on the injection amount calculated by the second injection amount calculation unit and a second tentative target value set to be smaller than the current target value, wherein the second cost is a cost of the second tentative target value; and
      a corrected target value setting unit configured to set one of the first tentative target value and the second tentative target value that gives a smaller cost as the corrected target value by comparing the first cost with the second cost.

2. The injection amount calculation device according to claim 1, wherein the future prediction unit performs the future prediction using a temperature of the exhaust gas before being introduced into a catalyst unit of the vehicle that includes the reduction catalyst as the current sensor value.

3. The injection amount calculation device according to claim 1, wherein
   the first cost calculation unit calculates the first cost such that the first cost increases as a slip amount of ammonia from the reduction catalyst increases, and
   the second cost calculation unit calculates the second cost such that the second cost increases as the slip amount of ammonia from the reduction catalyst increases.

4. An exhaust purification device comprising:
   a first selective reduction catalyst provided in an exhaust passage through which exhaust gas generated by an internal combustion engine flows;
   an oxidation catalyst provided downstream of the first selective reduction catalyst in the exhaust passage;
   a second selective reduction catalyst provided downstream of the oxidation catalyst in the exhaust passage;

a first injector to inject urea water into the exhaust passage upstream of the first selective reduction catalyst;

a second injector to inject urea water into the exhaust passage downstream of the first selective reduction catalyst and upstream of the second selective reduction catalyst;

an injection amount calculation device to determine an injection amount of urea water injected from the first injector and the second injector; and a temperature sensor to acquire a temperature of the exhaust gas or a temperature of the first selective reduction catalyst as a sensor value, wherein the injection amount calculation device comprises:
- a first calculation unit to determine the injection amount of the urea water from the first injector based on the sensor value and a target value of an ammonia adsorption amount of the first selective reduction catalyst so that the ammonia adsorption amount of the first selective reduction catalyst approaches the target value; and
- a prediction unit to calculate a corrected target value that is a corrected value of the target value based on the sensor value, the first calculation unit calculates the injection amount based on the corrected target value, and the prediction unit includes:
- a second calculation unit configured to calculate the injection amount based on the sensor value and a current target value so that the ammonia adsorption amount approaches the current target value;
- a first cost calculation unit configured to calculate a first cost by future prediction based on the injection amount calculated by the second injection amount calculation unit and a first tentative target value set to be larger than the current target value, wherein the first cost is a cost of the first tentative target value;
- a second cost calculation unit configured to calculate a second cost by future prediction based on the injection amount calculated by the second injection amount calculation unit and a second tentative target value set to be smaller than the current target value, wherein the second cost is a cost of the second tentative target value; and
- a corrected target value setting unit configured to set one of the first tentative target value and the second tentative target value that gives a smaller cost as the corrected target value by comparing the first cost with the second cost.

5. The exhaust purification device according to claim 4, wherein the temperature sensor acquires a temperature of the exhaust gas at an upstream side of the first selective reduction catalyst as the sensor value.

6. An injection amount controlling method for controlling an injection amount of urea water to a reduction catalyst for reducing nitrogen oxides contained in exhaust gas of a vehicle, the injection amount controlling method comprising:

correcting a target value of an ammonia adsorption amount of the reduction catalyst based on a current sensor value of the vehicle; and controlling the injection amount so that the ammonia adsorption amount approaches the corrected target value, wherein the correcting includes:
- calculating the injection amount based on the current sensor value and a current target value so that the ammonia adsorption amount approaches the current target value;
- calculating a first cost by future prediction based on the calculated injection amount and a first tentative target value set to be larger than the current target value, wherein the first cost is a cost of the first tentative target value;
- calculating a second cost by future prediction based on the calculated injection amount and a second tentative target value set to be smaller than the current target value, wherein the second cost is a cost of the second tentative target value; and
- setting one of the first tentative target value and the second tentative target value that gives a smaller cost as the target value by comparing the first cost with the second cost.

* * * * *